(12) United States Patent
Almeida et al.

(10) Patent No.: US 10,841,623 B1
(45) Date of Patent: Nov. 17, 2020

(54) SYSTEM AND METHOD FOR REAL-TIME DISTRIBUTED MPEG TRANSPORT STREAM ANALYSIS

(71) Applicant: CSC HOLDINGS, LLC, Bethpage, NY (US)

(72) Inventors: Heitor J. Almeida, Elmsford, NY (US); John Markowski, Smithtown, NY (US)

(73) Assignee: CSC Holdings, LLC, Bethpage, NY (US)

( * ) Notice: Subject to any disclaimer, the term of this patent is extended or adjusted under 35 U.S.C. 154(b) by 261 days.

(21) Appl. No.: 16/046,177

(22) Filed: Jul. 26, 2018

(51) Int. Cl.
*H04N 21/234* (2011.01)
*H04N 21/478* (2011.01)

(52) U.S. Cl.
CPC ..... *H04N 21/23418* (2013.01); *H04N 21/478* (2013.01)

(58) Field of Classification Search
None
See application file for complete search history.

(56) References Cited

U.S. PATENT DOCUMENTS

| | | | | |
|---|---|---|---|---|
| 6,023,725 A * | 2/2000 | Ozawa | ............... | H04N 21/2221 348/E5.008 |
| 6,453,355 B1 * | 9/2002 | Jones | ............... | H04L 29/06 370/259 |
| 6,567,501 B1 * | 5/2003 | Pernu | ............... | H04M 11/04 340/3.43 |
| 6,704,874 B1 * | 3/2004 | Porras | ............... | H04L 41/142 709/224 |
| 6,714,977 B1 * | 3/2004 | Fowler | ............... | H04L 12/2825 700/83 |
| 9,521,178 B1 * | 12/2016 | Gigliotti | ............... | H04L 65/602 |
| 9,686,168 B1 * | 6/2017 | Patidar | ............... | H04L 43/0805 |
| 10,148,548 B1 * | 12/2018 | Griffin | ............... | H04L 41/064 |
| 10,560,365 B1 * | 2/2020 | Losito | ............... | H04L 43/50 |
| 10,687,122 B2 * | 6/2020 | Schmidmer | ...... | H04N 21/44008 |
| 2003/0154242 A1 * | 8/2003 | Hayes | ............... | H04L 29/06 709/203 |
| 2007/0268836 A1 * | 11/2007 | Byun | ............... | H04L 43/00 370/252 |

(Continued)

*Primary Examiner* — Backhean Tiv
(74) *Attorney, Agent, or Firm* — Sterne, Kessler, Goldstein & Fox P.L.L.C.

(57) ABSTRACT

Embodiments include a system and method for a real-time distributed Transport Stream (TS) analysis that utilizes many parts of an available network to concurrently monitor TSs across a geographic region. Embodiments include the selection of a profile for each combination of a TS and a collection point where the profile includes one or more sets of acceptable transmission values or ranges associated with the combination. The profile may include for example, program service information tables, service information, TS transmission parameters, and/or general TS quality index analysis rules. Embodiments include real-time concurrent monitoring and analysis of multiple TSs from collection points distributed throughout the geographic region. As services associated with the TSs at different collection points evolve, the respective profiles and rules adapt accordingly to maintain the quality of service and performance associated with respective TS and collection point combinations.

20 Claims, 6 Drawing Sheets

(56) References Cited

U.S. PATENT DOCUMENTS

| | | | |
|---|---|---|---|
| 2009/0089620 A1* | 4/2009 | Johnson | H04L 43/50 714/37 |
| 2009/0210550 A1* | 8/2009 | Canann | H04N 21/44209 709/231 |
| 2011/0161485 A1* | 6/2011 | George | H04N 21/44209 709/224 |
| 2013/0101071 A1* | 4/2013 | Salinger | H04N 19/80 375/320 |
| 2013/0155882 A1* | 6/2013 | Pendleton | H04L 41/22 370/252 |
| 2013/0290450 A1* | 10/2013 | Butler | H04L 67/2838 709/206 |
| 2014/0006589 A1* | 1/2014 | Verrall | H04L 43/50 709/224 |
| 2015/0019658 A1* | 1/2015 | Barrera | H04L 51/16 709/206 |
| 2015/0244562 A1* | 8/2015 | Hanson | H04L 41/06 370/242 |
| 2015/0295801 A1* | 10/2015 | Vega | H04L 43/087 370/252 |
| 2016/0105346 A1* | 4/2016 | Pignataro | H04L 63/0435 370/253 |
| 2016/0105728 A1* | 4/2016 | Schmidmer | H04N 21/4425 725/110 |
| 2016/0164761 A1* | 6/2016 | Sathyanarayana | H04L 65/4084 709/219 |
| 2017/0006117 A1* | 1/2017 | Kafle | H04B 17/318 |
| 2017/0063716 A1* | 3/2017 | Marjou | H04L 47/801 |
| 2017/0324634 A1* | 11/2017 | Yermakov | H04L 47/28 |
| 2017/0347139 A1* | 11/2017 | Joshi | H04N 21/233 |
| 2017/0372364 A1* | 12/2017 | Andreou | G06F 3/04842 |

* cited by examiner

SYSTEM AND METHOD FOR REAL-TIME DISTRIBUTED MPEG TRANSPORT STREAM ANALYSIS

BACKGROUND

Field

Embodiments generally relate to cable networks and include managing moving picture experts group (MPEG) transport streams in a cable system.

Background Art

Cable systems send data via transport streams (TSs). Existing systems may collect alarms from generation and reception points but not in between. The alarms from the generation and reception points do not provide insight as to the quality and performance of the TS at various points throughout a network. Further, alarms received are reactions to data from the reception points for TSs that are accessed by a user.

BRIEF DESCRIPTION OF THE DRAWINGS/FIGURES

SUMMARY

Figure 1:
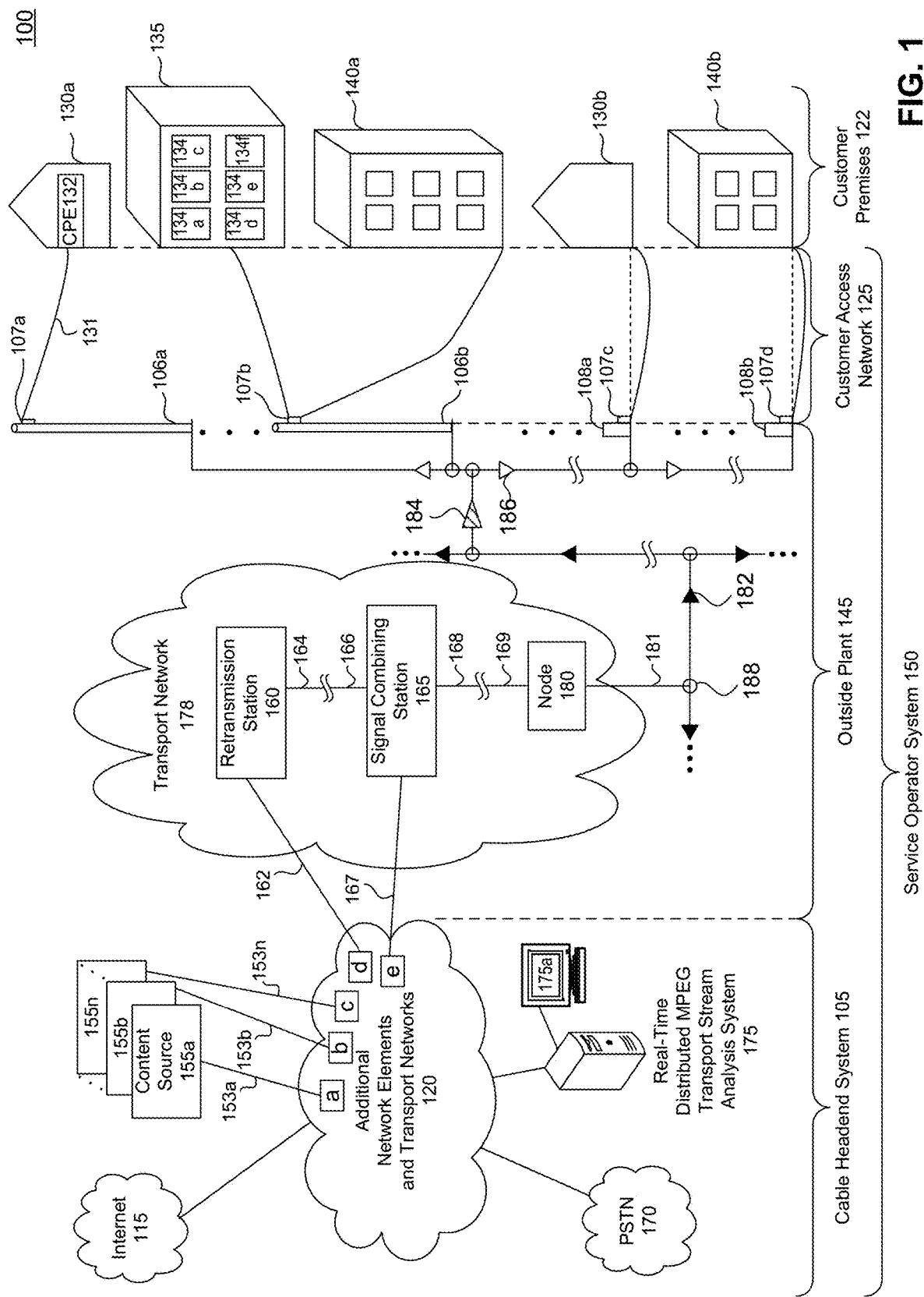
FIG. 1 illustrates an example system according to an embodiment.

Embodiments include a system and method for real-time distributed moving picture experts group (MPEG) Transport Stream (TS) analysis that utilizes many parts of an available network to concurrently monitor TSs across a geographic region. Embodiments include the selection of a profile for each combination of a TS and a collection point where the profile includes one or more sets of acceptable transmission values or ranges associated with each combination. The profile may include for example, program service information tables, service information, and/or general TS quality index analysis rules. Embodiments include real-time concurrent monitoring and analysis of multiple TSs from collection points across the geographic region. As services associated with the TSs at different collection points evolve, the respective profiles and rules adapt accordingly to maintain the quality of service and performance associated with respective TS and respective collection point combinations.

Some embodiments include receiving a first profile associated with a first TS associated with a first collection point of a plurality of collection points, where the first profile includes one or more sets of acceptable transmission values or ranges associated with the first TS; receiving a first set of rules associated with the first TS and the first collection point; and receiving in real time, first periodic samples of the first TS collected at the first collection point. Some embodiments also include determining a first difference between the received first periodic samples and the first profile, or between the received first periodic samples and the first set of rules; determining a second difference between previously received periodic samples and the received first periodic samples; and generating an alert based at least on the determined first and second differences.

Embodiments also include updating the first profile or the first set of rules by assessing the first set of rules, and adjusting a rule of the first set of rules based on the assessment. To update the first profile, some embodiments include receiving one or more additional or replacement sets of acceptable transmission values or ranges associated with the first TS; or receiving one or more additional or replacement rules of the first set of rules. Some embodiments include receiving in real time, second periodic samples of the first TS collected at the first collection point; and determining no differences between the received second periodic samples and the first profile, or between the received second periodic samples and the first set of rules.

Some embodiments include receiving in real time, second periodic samples of the first TS collected at the first collection point; and determining a third difference between the received second periodic samples and the first profile, or between the received second periodic samples and the first set of rules; determining no difference between the first received periodic samples and the received second periodic samples; and generating an alarm based at least on the determined third and no differences. Embodiments also include receiving in real time, third periodic samples of the first TS collected at the first collection point; and determining no difference between the received third periodic samples and the first profile, or between the received third periodic samples and the first set of rules.

In some embodiments the determining the first and the second differences occur after receiving subsequent periodic samples of the first TS, even when the first TS is not accessed. Further, the first collection point may be a customer premise equipment (CPE), where the CPE is tuned to a frequency associated with the first TS to obtain the first periodic samples. In some embodiments, the first TS is a backup TS whose services or programs may not be accessed (e.g., not yet subscribed to) by a user.

In some embodiments, the plurality of collection points are distributed throughout a geographic region, where a second collection point of the plurality of collection points may be associated with one or more TSs. Some embodiments include receiving in real time, respective periodic samples of one or more TSs of the second collection point and the remaining collection points of the plurality of collection points; concurrently analyzing the received respective periodic samples based on respective profiles and respective sets of rules; and generating an alert accordingly. A combination of a TS of the one or more TSs and a collection point of the plurality of collection points may be associated with: a respective profile of the respective profiles, and a respective set of rules of the respective sets of rules. Embodiments further include adjusting the respective profiles or the respective sets of rules over time. Some embodiments further include a graphical user interface (GUI) that displays real-time results of the determined first and second differences.

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments" does not require that all embodiments include the discussed feature, advantage or mode of operation. Alternate embodiments may be devised without departing from the scope of the disclosure, and well-known elements of the disclosure may not be described in detail or may be omitted so as not to obscure the relevant details. In addition, the terminology used herein is for the purpose of describing particular embodiments only and is not intended to be limiting of the disclosure. For example, as used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

DETAILED DESCRIPTION OF EMBODIMENTS

Figure 6:
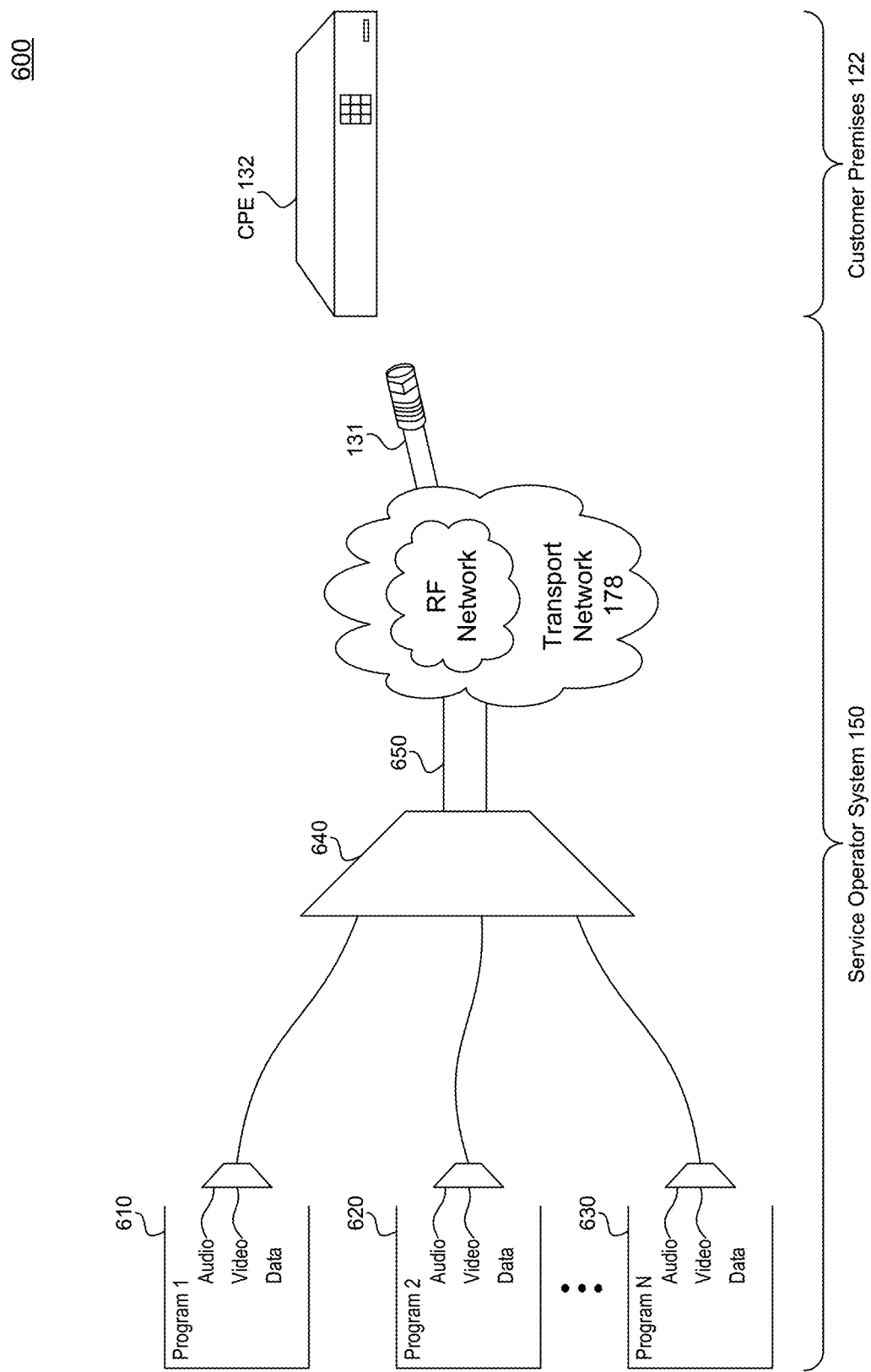
FIG. 6 illustrates an example system supporting a TS.

Cable networks send data via transport streams (TSs). FIG. 6 illustrates an example system 600 that includes service operator system 150 and customer premises 122 that support a transport stream (TS) 650. Content sources 610, 620, and 630 may provide N programs (e.g., channels) where N is an integer. The programs may be multiplexed together via multiplexer 640 to produce TS 650. TS 650 and other TSs (not shown) traverse transport network 178 that may include fiber optic equipment and a radio frequency (RF) network. TS 650 may be delivered to customer premise equipment (CPE) 132 via coaxial cable 131. CPE 132 may receive TS 650, decode TS 650, and the subscribed program (e.g., Program 2) may be displayed on a monitor such as a TV (not shown.)

Existing systems may collect alarms from a generation point such as multiplexer 640 and reception point CPE 132, but not in between. The alarms from the generation and reception points do not provide insight as to the quality and performance of TS 650 at various points throughout transport network 178 across a geographic region. Further, the alarms sent from CPE 132 to a management system for system 600 are reactions to data at CPE 132. And, the alarms sent from CPE 132 do not change and evolve consistently as the service (e.g., subscriptions to programs) associated with TS 650 evolves. Finally, alarms from CPE 132 are determined when a service (e.g., Program 2) on TS 650 is being accessed by a user. If the user is not accessing Program 2, the quality of TS 650 is not monitored.

In contrast to existing systems, embodiments include a system and method for real-time distributed TS analysis that utilizes many parts of an available network to concurrently monitor TSs across a geographic region. FIG. 1 illustrates an example system 100 according to an embodiment. System 100 includes a service operator system 150 that serves customer premise equipment (CPEs) associated with customer premises 122. Service operator system 150 such as a cable system includes cable headend system 105, outside plant 145, and customer access network 125.

Service operator system 150 supports a range of services including but not limited to television, video, and audio services, Internet access, and Voice over Internet Protocol (VoIP) services. For example, a television program may be broadcast from content sources 155a-155n through additional NEs and transport networks 120 to outside plant 145, and customer access network 125 such as coaxial cable 131 to deliver the television program to CPE 132 in house 130a. One or more CPE (e.g., CPE 132, 134a-134f) associated with one or more customer accounts in house 130a or building 135 may communicate with a service operator system 150 (e.g., real-time distributed moving picture experts group (MPEG) TS analysis system 175 with display 175a, "analysis system 175") where communication may be bidirectional. Cable headend system 105 also includes access to the Public Switched Telephone Network (PSTN) 170 and the Internet 115. Although MPEG TS analysis is discussed in the disclosure, analysis system 175 is not limited to MPEG TS (e.g., the data structures utilized are not limited to MPEG TS.)

Outside plant 145 (e.g., a trunk system and a distribution system) may include but is not limited to transport network 178 (e.g., a high-speed two-directional transport network such as a hybrid fiber-coaxial (HFC) network that includes optical fiber and/or coaxial cable), node 180, splitters 188, trunk lines coupled to trunk amplifiers 182, bridge amplifier 184 that couples a trunk line to a branch line, line extender amplifier 186, cable poles 106 to provide a pole-to-pole connection, pedestals 108 such as a repeater, an optical line terminal, or a passive optical network (not shown). Transport network 178 may include retransmission station 160, signal combining station 165, node 180, as well as hubs, trunks, and NEs that support transporting signals (e.g., transport streams (TS) from a cable headend system to a node. Retransmission station 160 may retransmit one or more TSs received from network element d to signal combining station 165 or in the reverse direction. Signal combining station 165 may add or remove programs, ad spots (e.g., commercials), or local programs from one or more TSs.

Node 180 may convert optical signals to electrical signals sent via outside plant 145 and may convert electrical signals from customer premise devices to optical signals that are sent over transport network 178 to additional NEs and transport networks 120. Outside plant 145 terminates at distribution taps 107a-d. A distribution tap 107 may be associated with customer access network 125 and one or more distinct customer accounts. For example, tap 107d coupled to building 140b may support more than one distinct customer account. Although outside plant 145 depicts node 180 supporting customer accounts associated with buildings 130a, 130b, 135, 140a, and 140b, node 180 may support a large geographic region including over 500 distinct customer accounts for example. Node 180 may include over a hundred different NEs (e.g., splitters, amplifiers, taps), and service operator system 150 may include many nodes, and support millions of distinct customer accounts. Although node 180 is shown, there may be many nodes and other NEs in system 100.

A CPE may include but is not limited to: a data modem, a telephony cable modem, a video cable modem (e.g., a cable modem combined with a set top box (STB)), a power supply cable modem, or a Wi-Fi cable modem. A cable modem device may include an Ethernet interface and/or a universal serial bus (USB) interface. Cable modem devices may connect to a variety of devices including, but are not limited to the following: a STB that may connect to television; routers that may include a wireless and/or wired home network such as a local area network; a computing device that may include but is not limited to a personal computer, a smart TV, or a laptop. Routers support equipment such as computing devices that may include but are not limited to personal computers, laptops, and tablets, as well as mobile cellular devices. Cable modems may be integrated with components such as a STB or a Multimedia Terminal Adapter (MTA) which is a VoIP adapter. For example, standard telephones may connect to an MTA to obtain VoIP service.

Embodiments include the selection of a profile for each combination of a TS and a collection point where the profile includes one or more sets of acceptable transmission values or ranges associated with each combination. The profile may include for example, program service information tables, service information, program identifiers (PIDs), TS transmission parameters, and/or general TS quality index analysis rules. Embodiments include real-time concurrent monitoring and analysis of multiple TSs from collection points across the geographic region. As services associated with the TSs at different collection points evolve, the respective profiles and rules adapt accordingly to maintain the quality of service and performance associated with respective TS and collection point combinations.

Figure 2:
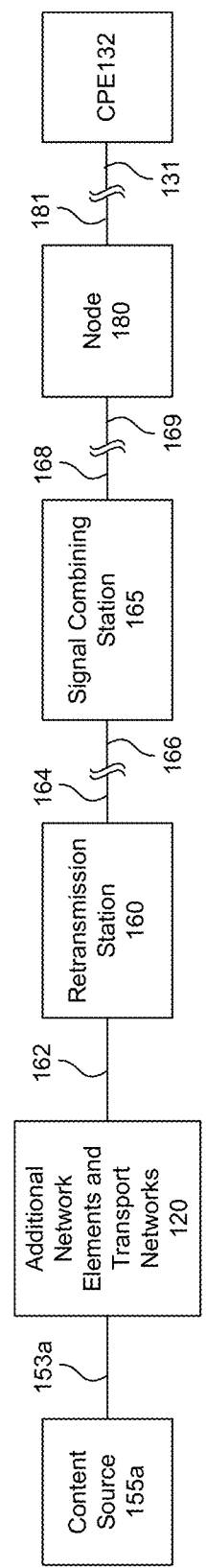
FIG. 2 illustrates a block diagram that includes collection points for a transport stream (TS), according to an embodiment.

FIG. 2 illustrates a block diagram 200 that includes collection points for a TS, according to an embodiment. For ease of discussion, and without limitation, block diagram 200 may be described with regard to elements of system 100. Block diagram 200 includes a TS named TS1 for convenience, that is transmitted from content source 155a via additional network elements and transport networks 120 that includes elements a-e, retransmission station 160, signal combining station 165, and node 180 before being received by CPE 132. A collection point may be located on one or more of the elements of block diagram 200 to collect samples of a signal being received, or to collect samples of a signal being transmitted. In some embodiments the collection point includes software instructions in memory that may be read and executed by a processor of an element, and/or a hardware device coupled to an element.

For example, when TS1 originates at content source 155a and is received at element a of additional network elements and transport networks 120 via connection 153a, a collection point may be located at element a. Collection point at element a may periodically sample TS1 and transmit the periodic samples to analysis system 175. Analysis system 175 includes a profile for each combination of TS1 and a collection point. For example, analysis system 175 includes a profile associated with TS1 received at element a. If 4 TSs originated from content source 155a to element a, then analysis system 175 would include 4 profiles, each profile being associated with each combination of a TS received at element a.

A profile may include a set of one or more golden samples. A golden sample may include acceptable transmission values and/or ranges, as well as rules for evaluating the periodic samples of the respective TS collected at a respective collection point. The set of golden samples may be determined from an initial TS transmission and stored at analysis system 175 and/or stored in a database (not shown) coupled to analysis system 175. For example, periodic samples of the TS1 collected from element a are analyzed with a respective profile that includes a set of golden samples associated with the combination of the TS1 and element a. TS1 may be modified (e.g., programs added/removed, ad spots added/removed, or transmission values adjusted) as TS1 traverses from element a within additional network elements and transport networks 120 to element d. Element d may include two collection points, one sampling the received TS1 and another sampling the transmitted TS1 output to connection 162. Analysis system 175 can include two more profiles, one for TS1 received at element d, and TS1 transmitted at element d. And, each of the profiles may include a set of one or more respective golden samples.

Continuing along block diagram 200, analysis system 175 may include additional profiles: one associated with TS1 received via connection 162 at retransmission station 160 and another associated with TS1 transmitted via connection 164 at retransmission station 160. There may be additional elements not shown between connections 164 and 166 that may change TS1. Thus, analysis system 175 may include two more profiles: a first profile associated with TS1 received via connection 166 at signal combining station 165, and a second profile associated with TS1 transmitted at signal combining station 165 via connection 168. As signal combining station 165 may add/remove/change programs, transmission parameters, and noise of TS1, the second profile may include different golden samples than the first profile. Continuing the example, analysis system 175 may include: a profile for TS1 received via connection 169 at node 180; a profile for TS1 transmitted at node 180 via connection 181; and a profile for TS1 received at CPE 132 via coaxial cable 131.

Accordingly, analysis system 175 may include a profile for each TS/collection point combination where the collection points may be distributed throughout a geographic region. For example, a service operator of system 100 can manage in real time, the quality of a TS as the TS traverses from content source 155a via distributed collection points across the geographic region of system 100 to CPE 132. The collection points collect periodic samples and transmit them to analysis system 175 in real time. The types of samples to be collected may change over time. Analysis system 175 may change and transmit the types of samples to be collected at the distributed collection points, and the types of samples collected at one collection point can be different from another collection point, or be the same as another collection point. The samples may include for example, program service information tables, PIDs, service information, and/or general TS quality parameters.

Figure 3:
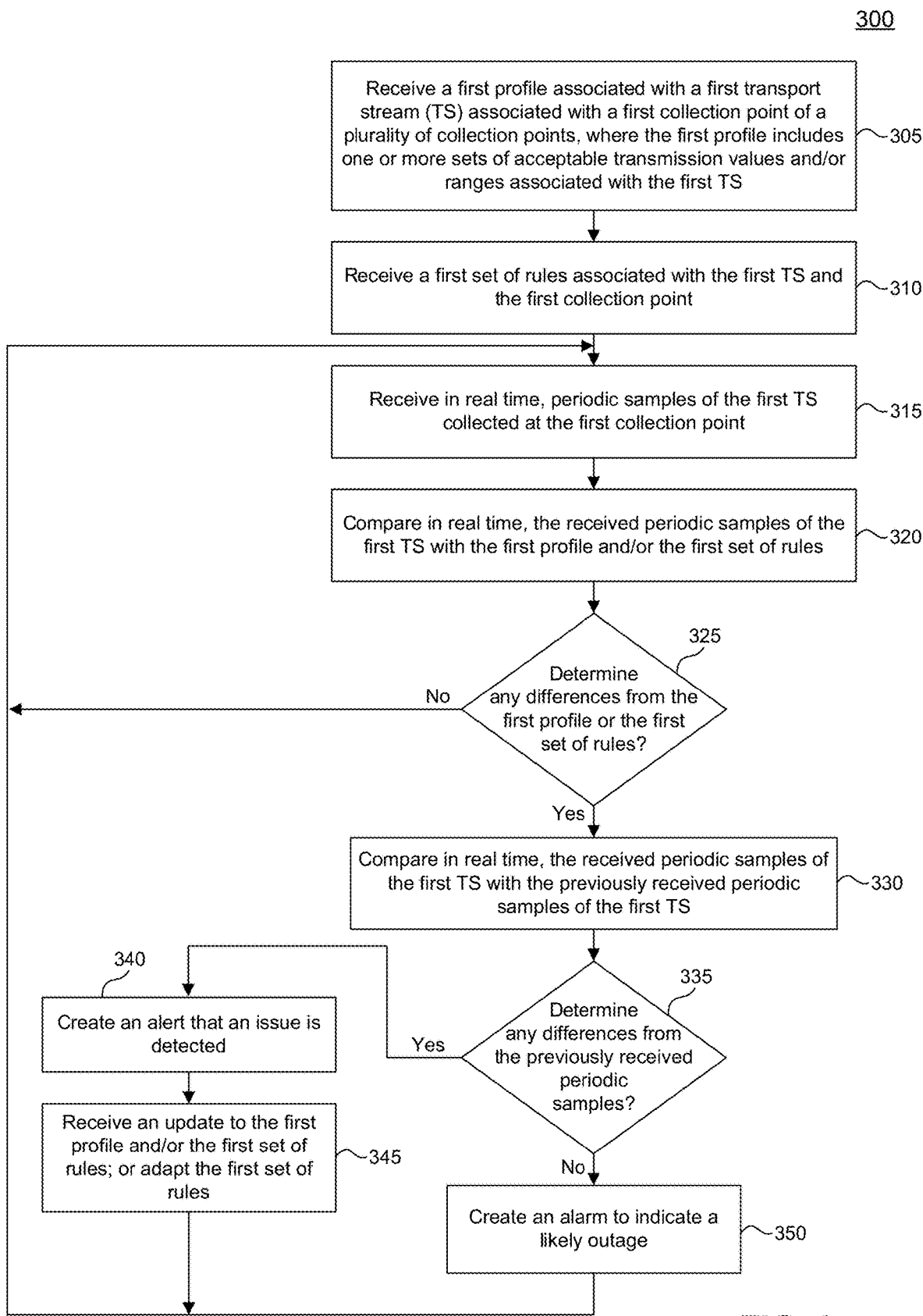
FIG. 3 illustrates a method for a real-time distributed moving picture experts group (MPEG) TS analysis system, according to an embodiment.

FIG. 3 illustrates a method 300 for real-time distributed moving picture experts group MPEG TS analysis system 175, according to an embodiment. For convenience and without limitation, method 300 may be described in terms of elements shown in FIGS. 1 and 2.

At 305, method 300 receives a first profile associated with a first TS associated with a first collection point of a plurality of collection points, where the first profile includes one or more sets of golden samples. The golden samples may include acceptable transmission values and/or ranges associated with the first TS. For example, once data collection software is loaded onto an element (e.g., element d, retransmission station 160, signal combining station 165, node 180, or CPE 132) the initial data samples of the first TS collected at the data point may be transmitted back to analysis system 175 via the service operator system 150 or manually captured in a portable device by a technician. The initial data samples may be uploaded to analysis system 175. A network manager may utilize the initial data samples to determine one or more sets of golden samples to create the first profile that may be saved or uploaded to analysis system 175.

At 310, method 300 receives a first set of rules associated with the first TS and the first collection point. In some embodiments the first set of rules may be included in the first profile. For example, the network manager may utilize the initial data samples to determine the first set of rules associated with the first TS and the first collection point that may be saved or uploaded to analysis system 175.

At 315, method 300 receives in real time, periodic samples of the first TS collected at the first collection point. For example, analysis system 175 may receive periodic samples from the first collection point as well as the remaining collection points of the plurality of collection points distributed across the geographic region of service operator system 150.

At 320, method 300 compares in real time, the received periodic samples of the first TS with the first profile and/or the first set of rules. For example, analysis system 175 may compare the first period samples received (e.g., from element d, retransmission station 160, signal combining station 165, node 180, or CPE 132) with the first profile and/or the first rules to assess the quality of the services (e.g., programs) carried on the first TS at the first collection point. In some embodiments a respective comparison is performed in real time for each combination of a TS and a collection point of the plurality of collection points distributed across the geographic region of service operator system 150.

At 325, method 300 determines any differences between the received periodic samples of the first TS and first profile and/or between the received periodic samples of the first TS and the first set of rules. The differences include values that are outside the acceptable values/ranges of the first profile. If differences exist, method 300 proceeds to 330. Otherwise, the period samples are satisfactory and method 300 returns to 315 to await the next set of periodic samples associated with the first TS and the first collection point.

At 330, method 300 compares in real time, the received periodic samples of the first TS with the previously received periodic samples of the first TS from the first collection point. For example, analysis system 175 determines whether any changes have taken place from the previous periodic sample or whether an issue persists.

At 335, method 300 determines any differences from the previously received periodic samples. A difference may be different parameters detected, different values of a parameter that were not acceptable in a previous periodic sample of the first TS but are acceptable in the periodic sample of the first TS, or vice versa. When a difference is determined, method 300 proceeds to 340. If no difference is determined, then an issue persists and method 300 proceeds to 350.

At 350, method 300 creates an alarm to indicate a likely outage. For example, analysis system 175 may generate an alarm on a graphical user interface (GUI) on display 175a, for example. A network manager may take additional actions to rectify the problem or outage. Method 300 returns to 315 to obtain next periodic samples.

Returning to 340 where a difference from the previous periodic samples exists, method 300 may create an alert that an issue is detected. For example, analysis system 175 may generate and display an alert on a GUI on display 175a.

At 345, method 300 may receive an update to the first profile and/or the first set of rules; in some embodiments method 300 may adapt or adjust the first set of rules. For example, a network manager may observe the alert and manually change the first profile and/or the first set of rules. The network manager may obtain the received first periodic samples and determine that the changes are consistent with the service growth and change one or more of the golden samples in the first profile to be consistent with the received first period samples. The changes are saved or uploaded to analysis system 175. In some embodiments analysis system 175 determines based on the first set of rules that the difference(s) detected are satisfactory and may update the first set of rules accordingly. Method 300 returns to 315 to obtain next periodic samples.

Figure 4:
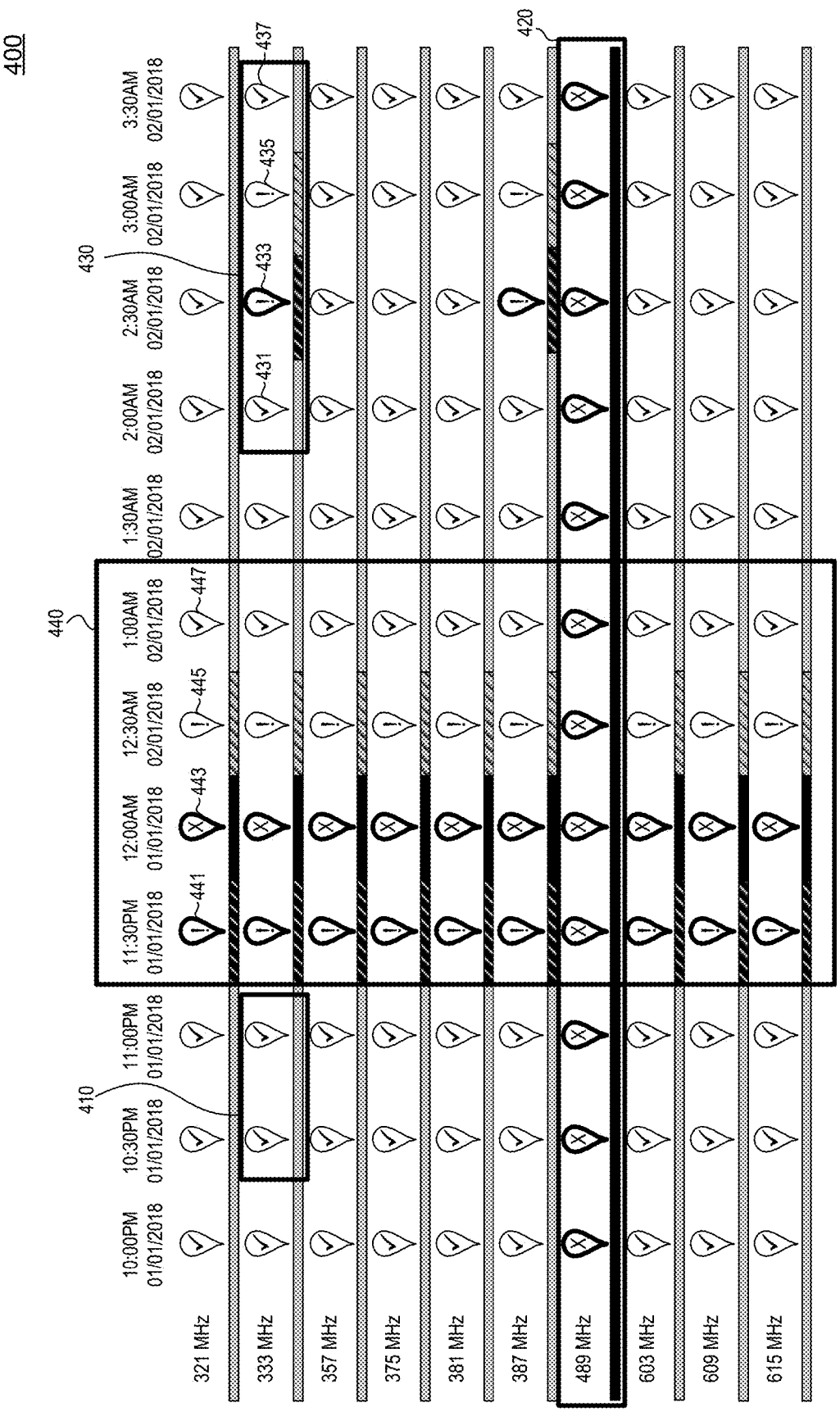
FIG. 4 illustrates an example graphical user interface (GUI), according to an embodiment.

FIG. 4 illustrates an example GUI 400, according to an embodiment. For convenience and without limitation, GUI 400 may be described in terms of elements shown in FIGS. 1-3. GUI 400 displays the results of method 300 performed by analysis system 175, on display 175a. GUI 400 may include periodic samples from a collection point of the plurality of collection points (e.g., from element d, retransmission station 160, signal combining station 165, node 180, or CPE 132). Thus, analysis system 175 may include a GUI 400 for each combination of a TS and a collection point of the plurality of collection points across a geographic region. Accordingly, a network manager can observe in real time the impacts that a network element has on services carried via a TS as well as the service quality being delivered to a CPE, even when a user is not accessing the service (e.g., not viewing the program and/or ad spots.)

The top row of GUI 400 indicates the date and periodic sample times when the periodic samples are collected and subsequently transmitted to analysis system 175. In the example the samples are collected every half hour, but the sample times can be readily changed. Analysis system 175 may transmit this change to one or more collection points of the plurality of collection points across the geographic region. The leftmost column indicates the radio frequency (RF) associated with a TS. In this example, 10 TSs are shown for convenience. Some network elements like node 180 can continuously monitor up to 158 RFs (or 158 TSs).

Selection 410 illustrates acceptable service performance with a "✓" within a pin icon, that periodic samples collected at 10:30 PM and subsequently at 11:00 PM satisfy the profile for the combination of TS at 333 MHz and the data collection point. In some embodiments the respective profile and/or respective rules may be manually or automatically adjusted as a service progresses, even though no alerts or alarms have been determined (e.g., see FIG. 3 at 320, 325, 315.)

Selection 420 illustrates unacceptable service via a "X" within a bolded pin icon, that the TS at 489 MHz that has an alarm. For example, the periodic samples did not satisfy the comparison with the respective profile and/or respective rules, and the comparison with the previous periodic samples do not indicate any changes (e.g., see FIG. 3 at 320, 325, 330, 335, 350.) Thus, GUI 400 indicates an alarm. Note that TS at 489 MHz could be a backup resource that is not in use (e.g., not viewed by customers) or TS at 489 MHz could be subscribed to by a user who is not using the service (e.g., not viewing any programs carried by TS at 489 MHz, and the service quality is still monitored. This allows a network manager to make necessary changes such as engaging a different TS to deliver the subscribed programs to the customer who may be unaware. Or, if the customer does contact the customer service department, the department can indicate that the problem has been identified and is being corrected. Either case enables improved customer satisfaction compared to existing analysis solutions. For example, if GUI 400 pertained to the transmission of the TS at 489 at element d of additional network elements and transport networks 120 to connection 162, analysis system 175 and/or a network manager may move the program content to a different TS on element d. In another example, the program content may be moved to a different TS and a different collection point (e.g., a different TS on element e via connection 167.)

Selection 430 illustrates a transition from acceptable service performance to an alert that was timely addressed and the service returned to acceptable service performance. For the TS at 333 MHz, periodic samples 431 satisfied the respective profile and/or respective rules shown the "✓" within a pin icon (e.g., see FIG. 3 at 320, 325, 315.) Periodic samples 433 did not satisfy the respective profile and/or respective rules, but a difference from the previous periodic samples 431 was determined so an alert is issue as shown by an "!" within a bolded pin icon (e.g., see FIG. 3 at 320, 325, 330, 335, 340.) A network manager may manually update one or more respective golden samples and/or respective rules based on service progression. For example, the network manager may be aware of planned network maintenance where one of the programs of the TS is being removed and the network manager changes a golden sample from expecting four programs to expecting 3 programs (e.g., expecting 3 program IDs (PIDs) instead of 4 PIDs.) In another example, the respective rules may be automatically updated. A TS may include 4 higher quality program transmissions (e.g., HD) or up to 10 standard quality program transmissions (e.g., SD). Analysis system 175 may determine that the TS at periodic sample 433 transition from 4 HD programs to 1 HD program and 6 SD programs, and adjust the respective rules to accept the change. Thus, the respective profiles and/or respective rules for a TS and a collection point may change/adapt over time to reflect the changes in the service provided in a geographic region (e.g., FIG. 3, see 345.) This is in contrast to existing solutions that react to data, generate and send alerts or alarms to a network management system. Those existing solutions do not evolve and adapt to the service progression let alone evolve and adapt based on a given TS and a given collection point over time. Periodic samples 435 may be compared with and satisfy the updated respective profile and/or updated respective rules and the transition away from an alert is illustrated by an "!" within an unbolded pin icon (e.g., see FIG. 3 at 320, 325, 315.) Periodic samples 437 may be compared with and satisfy the updated respective profile and/or updated respective rules illustrated by a "✓" within a pin icon (e.g., see FIG. 3 at 320, 325, 315.).

Selection 440 illustrates how the performance of a collection point impacts the service provided to customers. The alarms at midnight indicate that all of the TSs at the collection point associated with GUI 400 were negatively affected, and GUI 400 illustrates the recovery via subsequent periodic samples (e.g., 441, 443, 445, and 447.) The effects of the collection point's performance on the various TSs and therefore the impact on customer accounts are readily understood. Understanding the impacts enables proactive actions that increase service quality and hence, customer satisfaction.

Figure 5:
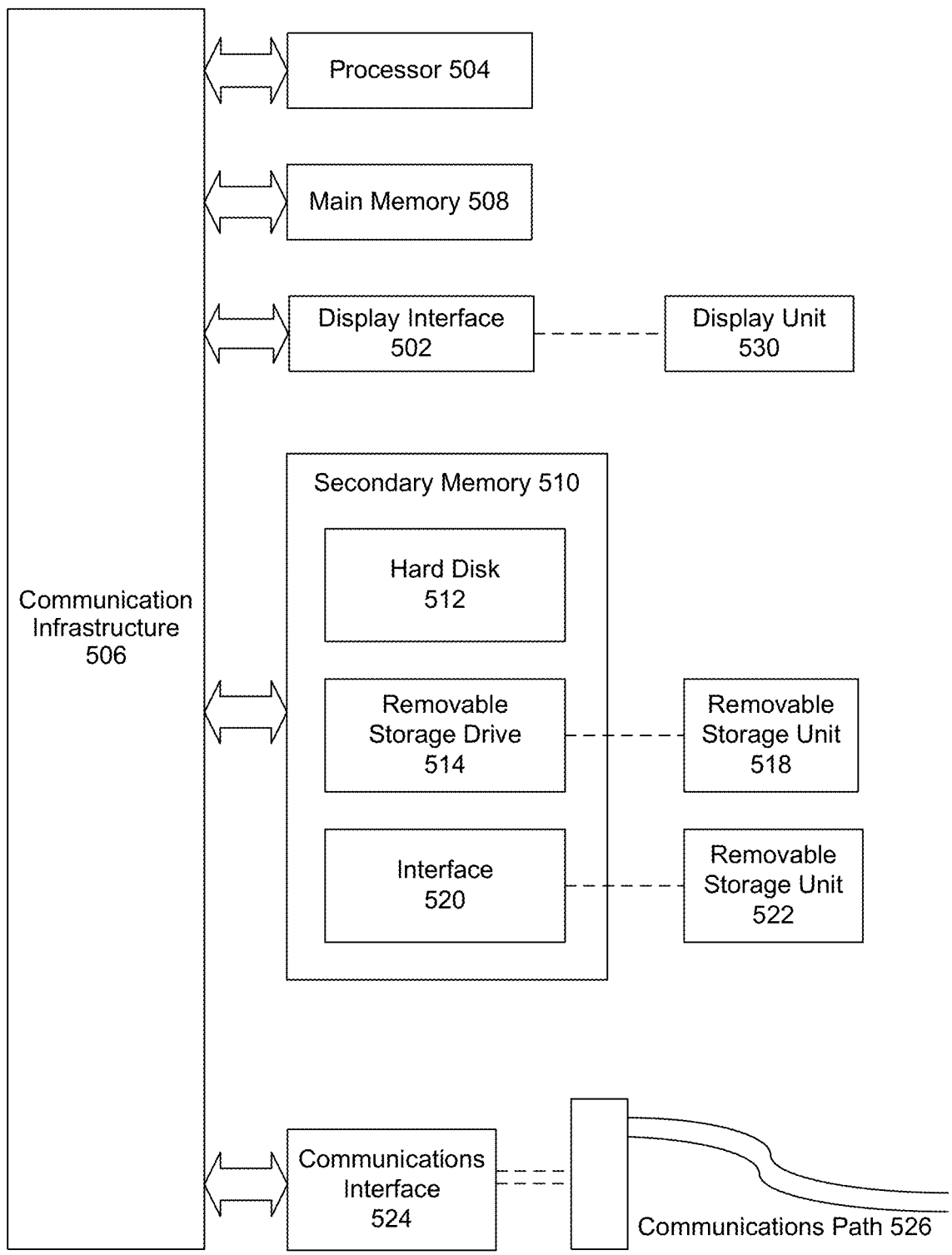
FIG. 5 illustrates an example computer system which can be used to implement an embodiment.

Various aspects of the disclosure can be implemented by software, firmware, hardware, or a combination thereof. FIG. 5 illustrates an example computer system 500 in which some embodiments, or portions thereof, can be implemented as computer-readable code. Various embodiments are described in terms of the example computer system 500. After reading this description, it will become apparent to a person skilled in the relevant art how to implement the embodiments using other computer systems and/or computer architectures. For example, real-time distributed MPEG TS analysis system 175 may be implemented by computer system 500.

Computer system 500 includes one or more processors, such as processor 504. Processor 504 may comprise suitable logic, circuitry, dedicated circuits, and/or code that may enable processing data and/or controlling operations of computer system 500. Processor 504 can be a special purpose or a general purpose processor. Processor 504 is connected to a communication infrastructure 506 (for example, a bus or network). Processor 504 may be enabled to provide control signals to the various other portions of computer system 500 via communication infrastructure 506, for example. As an example, processor 504 may be configured to perform the method as described in FIG. 3 and support the GUI as described in FIG. 4, to manage distributed transport streams in real time.

Computer system 500 also includes a main memory 508, and may also include a secondary memory 510. Secondary memory 510 may include, for example, a hard disk drive 512, a removable storage drive 514, and/or a memory stick. Removable storage drive 514 may comprise a floppy disk drive, a magnetic tape drive, an optical disk drive, a flash memory, or the like. The removable storage drive 514 reads from and/or writes to a removable storage unit 518 in a well-known manner. Removable storage unit 518 may comprise a floppy disk, magnetic tape, optical disk, etc. that is read by and written to by removable storage drive 514. As will be appreciated by persons skilled in the relevant art(s), removable storage unit 518 includes a computer usable storage medium having stored therein computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 that allow software and data to be transferred from the removable storage unit 522 to computer system 500.

Computer system 500 may also include a communications interface 524. Communications interface 524 allows software and data to be transferred between computer system 500 and external devices. Communications interface 524 may include a modem, a network interface (such as an Ethernet card), a communications port, a PCMCIA slot and card, or the like. Software and data transferred via communications interface 524 are in the form of signals that may be electronic, electromagnetic, optical, or other signals capable of being received by communications interface 524. These signals are provided to communications interface 524 via a communications path 526. Communications path 526 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 518, removable storage unit 522, and a hard disk installed in hard disk drive 512. Computer program medium and computer usable medium can also refer to memories, such as main memory 508 and secondary memory 510, which can be memory semiconductors (e.g. DRAMs, etc.). These computer program products are means for providing software to computer system 500.

Computer programs (also called computer control logic) are stored in main memory 508 and/or secondary memory 510. Computer programs may also be received via communications interface 524. Such computer programs, when executed, enable computer system 500 to implement the embodiments as discussed herein. In particular, the computer programs, when executed, enable processor 504 to implement the disclosed processes of FIGS. 3 and 4. Accordingly, such computer programs represent controllers of the computer system 500. Where the embodiments are implemented using software, the software may be stored in a computer program product and loaded into computer system 500 using removable storage drive 514, interface 520, hard drive 512 or communications interface 524. This can be accomplished, for example, through the use of general-programming languages (such as C or C++). The computer program code can be disposed in any known computer-readable medium including semiconductor, magnetic disk, or optical disk (such as, CD-ROM, DVD-ROM). As such, the code can be transmitted over communication networks including the Internet and internets. It is understood that the functions accomplished and/or structure provided by the systems and techniques described above can be represented in a core (such as a processing-unit core) that is embodied in program code and may be transformed to hardware as part of the production of integrated circuits. This can be accomplished, for example, through the use of hardware-description languages (HDL) including Verilog HDL, VHDL, Altera HDL (AHDL) and so on, or other available programming and/or schematic-capture tools (such as, circuit-capture tools).

Embodiments are also directed to computer program products comprising software stored on any non-transitory computer useable medium. Such software, when executed in one or more data processing device, causes a data processing device(s) to operate as described herein, for example, to perform the operations of FIGS. 3 and 4. Embodiments employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

It is to be appreciated that the Detailed Description section, and not the Abstract section, is intended to be used to interpret the claims. The Abstract section may set forth one or more but not all exemplary embodiments as contemplated by the inventor(s), and thus, are not intended to limit the embodiments and the appended claims in any way.

The accompanying drawings, which are incorporated herein and form part of the specification, illustrate the embodiments and, together with the description, further serve to explain the principles of the embodiments and to enable a person skilled in the pertinent art to make and use the embodiments. The embodiments will be described with reference to the accompanying drawings. Generally, the drawing in which an element first appears is typically indicated by the leftmost digit(s) in the corresponding reference number.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concepts of the embodiments. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the embodiments should not be limited by any of the above-described exemplary embodiments, but should be defined only in accordance with the following claims and their equivalents.

What is claimed is:

1. A system for real-time distributed transport stream (TS) analysis, comprising:
  a memory;
  one or more processors coupled to the memory, wherein the one or more processors are configured to:
    receive a first profile associated with a first TS associated with a first collection point of a plurality of collection points, wherein the first profile includes one or more sets of acceptable transmission values or ranges associated with the first TS;
    receive a first set of rules associated with the first TS and the first collection point;
    receive, in real time, first periodic samples of the first TS collected at the first collection point;
    determine a first difference between the first periodic samples received and the first profile, or between the received first periodic samples and the first set of rules;
    determine a second difference between previously received periodic samples and the received first periodic samples; and
    generate an alert based at least on the determined first and second differences.

2. The system of claim 1, wherein the one or more processors are further configured to:
  update the first profile or the first set of rules.

3. The system of claim 2, wherein to update the first set of rules, the one or more processors are configured to:
  assess the first set of rules; and
  adjust a rule of the first set of rules based on the assessment.

4. The system of claim 2, wherein to update the first profile or the first set of rules, the one or more processors are configured to:
  receive one or more additional or replacement sets of acceptable transmission values or ranges associated with the first TS; or
  receive one or more additional or replacement rules of the first set of rules.

5. The system of claim 1, wherein the one or more processors are further configured to:
  receive, in real time, second periodic samples of the first TS collected at the first collection point; and determine no differences between the received second periodic samples and the first profile, or between the received second periodic samples and the first set of rules.

6. The system of claim 1, wherein the one or more processors are further configured to:
receive, in real time, second periodic samples of the first TS collected at the first collection point; and
determine a third difference between the received second periodic samples and the first profile, or between the received second periodic samples and the first set of rules;
determine no difference between the first received periodic samples and the received second periodic samples; and
generate an alarm based at least on the determined third and no differences.

7. The system of claim 6, wherein the one or more processors are further configured to:
receive, in real time, third periodic samples of the first TS collected at the first collection point; and
determine no difference between the received third periodic samples and the first profile, or between the received third periodic samples and the first set of rules.

8. The system of claim 1, wherein the determining the first and the second differences occur after receiving subsequent periodic samples of the first TS, even when the first TS is not accessed.

9. The system of claim 8, wherein the first collection point is at a customer premise equipment (CPE), wherein the CPE is tuned to a frequency associated with the first TS to obtain the first periodic samples.

10. The system of claim 8, wherein the first TS is a backup TS.

11. The system of claim 1, wherein the plurality of collection points are distributed throughout a geographic region, wherein a second collection point of the plurality of collection points may be associated with one or more TSs, and wherein the one or more processors are further configured to:
receive, in real time, respective periodic samples of the one or more TSs of the second collection point;
concurrently analyze the respective periodic samples received based on respective profiles and respective sets of rules; and
generate an alert according to the concurrent analysis.

12. The system of claim 11, wherein a combination of a TS of the one or more TSs and the second collection point of the plurality of collection points is associated with: a respective profile of the respective profiles, and a respective set of rules of the respective sets of rules.

13. The system of claim 11, wherein the one or more processors are further configured to adjust the respective profiles or the respective sets of rules over time.

14. The system of claim 1, further comprising a graphical user interface (GUI) coupled to the one or more processors, wherein the one or more processors are configured to:
display on the GUI, real-time results of the determined first and second differences.

15. A method for real-time distributed transport stream (TS) analysis, comprising:
receiving a first profile associated with a first TS associated with a first collection point of a plurality of collection points distributed throughout a geographic region, where the first profile includes one or more sets of acceptable transmission values or ranges associated with the first TS;
receiving a first set of rules associated with the first TS and the first collection point;
receiving, in real time, first periodic samples of the first TS collected at the first collection point;
determining a first difference between the received first periodic samples and the first profile, or between the received first periodic samples and the first set of rules;
determining a second difference between previously received periodic samples and the received first periodic samples; and
generating an alert based at least on the determined first and second differences.

16. The method of claim 15, wherein a second collection point of the plurality of collection points may be associated with one or more TSs.

17. The method of claim 16, further comprising:
receiving, in real time, respective periodic samples of one or more TSs of the plurality of collection points;
concurrently analyzing the received respective periodic samples based on respective profiles and respective sets of rules; and
generating an alert according to the concurrent analysis.

18. The method of claim 17, wherein a combination of a TS of the one or more TSs and a collection point of the plurality of collection points is associated with: a respective profile of the respective profiles, and a respective set of rules of the respective sets of rules.

19. The method of claim 17, further comprising adjusting the respective profiles or the respective sets of rules over time.

20. A non-transitory computer-readable medium having instructions stored thereon, which when executed by a processor in an electronic device cause the processor to perform real-time distributed transport stream (TS) analysis operations comprising:
receiving one or more profiles, wherein a respective profile of the one or more profiles is associated with a combination of: a respective TS and a respective collection point of a plurality of collection points distributed throughout a geographic region, wherein the respective profile includes one or more sets of acceptable transmission values or ranges associated with the respective TS and the respective collection point;
receiving one or more sets of rules associated with respective TSs and respective collection points of the plurality of collection points;
receiving, in real time, periodic samples of the respective TSs collected at the respective collection points;
determining for the respective TS, a first difference between the respective periodic samples received and the respective profile, or between the respective periodic samples received and the respective set of rules;
determining for the respective TS, a second difference between previously received respective periodic samples and the respective periodic samples received; and
generating a respective alert based at least on the determined first and second differences.

* * * * *

UNITED STATES PATENT AND TRADEMARK OFFICE
CERTIFICATE OF CORRECTION

PATENT NO. : 10,841,623 B1  
APPLICATION NO. : 16/046177  
DATED : November 17, 2020  
INVENTOR(S) : Almeida et al.

Page 1 of 1

It is certified that error appears in the above-identified patent and that said Letters Patent is hereby corrected as shown below:

In the Specification

In Column 3, Line 64, delete "(CPEs)" and insert -- (CPE) --, therefor.

In Column 4, Line 34, delete "(TS)" and insert -- (TSs) --, therefor.

In Column 10, Line 25, delete "etc." and insert -- etc., --, therefor.

In Column 10, Line 65, delete "(e.g." and insert -- (e.g., --, therefor.

In Column 11, Line 28, delete "(HDL)" and insert -- (HDLs) --, therefor.

Signed and Sealed this  
Twenty-sixth Day of January, 2021

Drew Hirshfeld  
*Performing the Functions and Duties of the*  
*Under Secretary of Commerce for Intellectual Property and*  
*Director of the United States Patent and Trademark Office*